United States Patent
Lu et al.

(10) Patent No.: US 9,334,410 B2
(45) Date of Patent: May 10, 2016

(54) USE OF ALDEHYDE SCAVENGERS IN INTERIOR BUILDING PRODUCTS

(71) Applicant: USG Interiors, LLC, Chicago, IL (US)

(72) Inventors: Runhai Lu, Vernon Hills, IL (US); Terry L. Rosenstiel, Vernon Hills, IL (US); Salvatore Immordino, Trevor, WI (US); Weixin D. Song, Lake Forest, IL (US)

(73) Assignee: USG INTERIORS, LLC, Chicago, IL (US)

( * ) Notice: Subject to any disclaimer, the term of this patent is extended or adjusted under 35 U.S.C. 154(b) by 134 days.

(21) Appl. No.: 13/963,014

(22) Filed: Aug. 9, 2013

(65) Prior Publication Data

US 2013/0331494 A1     Dec. 12, 2013

Related U.S. Application Data

(62) Division of application No. 13/490,595, filed on Jun. 7, 2012, now abandoned.

(60) Provisional application No. 61/510,109, filed on Jul. 21, 2011.

(51) Int. Cl.
  C09D 7/12 (2006.01)
  C09D 7/00 (2006.01)
  C09D 161/28 (2006.01)
  C09D 161/00 (2006.01)

(52) U.S. Cl.
  CPC  *C09D 7/125* (2013.01); *C09D 7/00* (2013.01); *C09D 7/1233* (2013.01); *C09D 161/00* (2013.01); *C09D 161/28* (2013.01)

(58) Field of Classification Search
  CPC ........ C09D 161/32; C09D 7/125; C09D 7/00; C09D 161/28; C09D 7/1233; C09D 161/00; E04C 2/02
  USPC ............................................ 428/524; 52/515
  See application file for complete search history.

(56) References Cited

U.S. PATENT DOCUMENTS

| | | |
|---|---|---|
| 4,443,354 A | 4/1984 | Eian |
| 6,375,775 B2 | 4/2002 | Philbin et al. |
| 7,604,853 B2 | 10/2009 | Abe et al. |
| 7,955,472 B2 | 6/2011 | Abe et al. |
| 7,989,367 B2 | 8/2011 | Boyer et al. |
| 8,119,560 B2 | 2/2012 | Caldwell et al. |
| 8,173,219 B2 | 5/2012 | Tutin et al. |
| 2003/0099850 A1 | 5/2003 | Belmares et al. |
| 2007/0287018 A1 | 12/2007 | Tutin et al. |
| 2010/0037399 A1 | 2/2010 | Hoefler et al. |

FOREIGN PATENT DOCUMENTS

GB    2462619    2/2010

OTHER PUBLICATIONS

Currey, Mason. Pop Panels. Metropolis Magazine. Jan. 2007.*
Notification of Transmittal of the International Search Report and the Written Opinion of the International Searching Authority, or the Declaration, International Search Report and Written Opinion of the International Searching Authority dated Oct. 18, 2012 of corresponding International PCT Application No. PCT/US2012/046985, filed Jul. 17, 2012.

* cited by examiner

*Primary Examiner* — John Uselding
(74) *Attorney, Agent, or Firm* — Pearne & Gordon LLP

(57) ABSTRACT

A coating for application to the surface of an interior building product comprises: a resin formulation such as a melamine formaldehyde resin characterized by its ability to strengthen the interior building product when applied as a coating to the building product; and an aldehyde scavenger selected from the group consisting of; tetraethylene pentamine, propionamide, caprolactam, ammonium hydroxide, sodium bisulfate, sodium metabisulfite, ammonium primary phosphate, ammonium secondary phosphate, a combination of ammonium primary phosphate and ammonium secondary phosphate, a combination of ammonium primary phosphate, ammonium secondary phosphate and a sulfite, a polyvinyl alcohol; adipic dihydrazide and a combination of a polyvinyl alcohol and adipic dihydrazide.

14 Claims, No Drawings

USE OF ALDEHYDE SCAVENGERS IN INTERIOR BUILDING PRODUCTS

This application is a division of application Ser. No. 13/490,595, filed Jun. 7, 2012, which claims the benefit of U.S. provisional patent application Ser. No. 61/510,109, filed Jul. 21, 2011, each of which is incorporated herein in its entirety by reference.

FIELD OF THE INVENTION

The present invention in general concerns coatings that are applied to interior building products, such as ceiling tile for example, wherein the coatings include an aldehyde scavenger that possesses the ability to tie-up any aldehydes, including formaldehyde, and/or other volatile organic compounds that may tend to be emitted from the basic interior building products themselves and/or the coatings.

BACKGROUND OF THE INVENTION

Many interior building products such as ceiling tiles, fiber panels and gypsum wallboard and other types of wallboard, for example, following their installation, can exhibit a tendency to emit aldehyde, including formaldehyde, vapors and/or other kinds of volatile organic compounds ("VOCs") to their surroundings. The sources of the aldehydes and other VOC's may reside in the basic interior building product itself or in coverings, coatings and other adjuncts applied to the basic interior building product.

The emission of the aldehydes and other VOCs can be undesirable and efforts can be undertaken to avoid their release into their surroundings because of their deleterious effects on human and animal health, as well as on the general comfort of humans and animals exposed to the emissions. In this regard, formaldehyde and certain other VOC's that can be emitted from interior building products have been classified as cancer-causing agents.

Therefore, a need exists to control the emission of aldehydes, including formaldehyde, and other VOC's from these interior building products. One method of doing so involves incorporating with the interior building products a substance that will tie-up the aldehydes and other VOC's and prevent them from being released from the interior building products into the surrounding environment. Such substances can be incorporated into the interior building products either when the interior building products are manufactured, at the time the interior building products are installed or after the interior building products are installed for example.

One consideration in determining the suitability of any particular substance for the purpose of tying-up aldehydes and other VOC's can be the effect the composite that is formed as a result of the substance tying-up an aldehyde or another VOC has on the interior building product. That is to say that the composite should not adversely affect the physical or chemical properties or esthetic values of the interior building product.

SUMMARY OF THE INVENTION

As used herein the expression "aldehyde scavenger" is intended to refer to any substance used for the purpose of tying-up aldehydes and other VOC's whether, for example, by covalent chemical bonding, ionic interaction, improved incorporation of the aldehydes and/or other VOC's to the substrate at which the aldehydes and/or other VOC's are present, phase transformation, hydrogen bonding or otherwise.

According to one aspect, the present invention concerns a coating for application to the surface of an interior building product, including a resin formulation characterized by its ability to strengthen the interior building product when applied as a coating to the building product together with an aldehyde scavenger.

According to another aspect of the invention, the aldehyde scavenger is selected from the group consisting of; tetraethylene pentamine, propionamide, caprolactam, ammonium hydroxide, sodium bisulfate, sodium metabisulfite, ammonium primary phosphate, ammonium secondary phosphate, a combination of ammonium primary phosphate and ammonium secondary phosphate, a combination of ammonium primary phosphate, ammonium secondary phosphate and a sulfite, a polyvinyl alcohol, adipic dihydrazide and a combination of a polyvinyl alcohol and adipic dihydrazide.

In a further aspect of the invention, the resin formulation includes a melamine formaldehyde resin and the aldehyde scavenger comprises individually, or in combination, a polyvinyl alcohol and adipic dihydrazide.

In an additional aspect of the invention, the melamine formaldehyde resin formulation comprises by weight: approximately 10% to 20% of a melamine formaldehyde resin; approximately 20% to 60% of a calcium carbonate filler and approximately 0% to 10% of a clay filler; approximately 20% to 80% water; an ammonium chloride and/or magnesium catalyst; and sufficient defoamer to suppress the formation of any foam in the resin formulation. In a particular embodiment of this additional aspect, the melamine formaldehyde resin formulation comprises by weight: approximately 10% to 20% of a melamine formaldehyde resin; approximately 35% of a calcium carbonate filler and approximately 5% of a clay filler; and approximately 40% water.

In yet another aspect of the invention, the interior building product to which the coating is applied can comprise ceiling tile.

DETAILED DESCRIPTIONS OF EXAMPLES OF THE INVENTION

Examples of embodiments that incorporate one or more aspects of the present invention are described below. These examples are not intended to be limitations on the present invention. Thus, for example, in some instances, one or more examples of the present invention described with reference to one aspect or embodiment can be utilized in other aspects and embodiments. In addition, certain terminology is used herein for convenience only and is not to be taken as limiting the present invention.

The present invention has application to a variety of interior building products including, for example, ceiling tiles, fiber panels and gypsum wallboard and other types of wallboard and comprises coatings that are applied to at least one surface, i.e., the outside, of the interior building products. In a particular employment of the invention, the coating is applied to the back outside surface of a ceiling tile; that is, the surface of the ceiling tile that is not exposed. In an embodiment of the invention, the coatings include a resin formulation characterized by its ability to strengthen the interior building products when applied as a coating to the building products together with an aldehyde scavenger. The coatings can be applied to the surface of the ceiling tiles by employing spraying techniques or rollers that hold the coatings, for example, and can be applied at the completion of the tile-manufacturing process, at the time the ceiling tiles are installed or following the installation of the ceiling tiles for example.

In an embodiment of the invention, the resin formulation includes a melamine formaldehyde resin such as, for example, a butylated form of the resin that is dissolved in n-butanol and xylene and then cross-linked with alkyd, epoxy, acrylic and polyester resins. The melamine formaldehyde resin forms a hard covering on the ceiling tile and provides the ceiling tile with the strength required for the ceiling tile to remain intact while being suspended from open gridwork typically installed at the ceilings of interior structures for example.

In a particular aspect of the present invention, the melamine formaldehyde resin can be included in a melamine formaldehyde resin formulation included in the coatings of the invention comprising by weight: approximately 10% to 20% of the melamine formaldehyde resin; approximately 20% to 60% of a calcium carbonate filler and approximately 0% to 10% of a clay filler; approximately 20% to 80% water; an effective amount of an ammonium chloride and/or magnesium chloride catalyst; and sufficient defoamer to suppress the formation of any foam in the resin formulation. In an embodiment of this particular aspect of the invention, the melamine formaldehyde resin can be included in a melamine formaldehyde resin formulation comprising by weight: approximately 10% to 20% of a melamine formaldehyde resin; approximately 35% of a calcium carbonate filler and approximately 5% of a clay filler; and approximately 40% water.

In addition to the resin formulation, the coatings of the present invention include an aldehyde scavenger. The primary function of the aldehyde scavenger is to tie-up any aldehydes and other VOC's that may tend be emitted from the ceiling tiles themselves and/or coatings applied to the ceiling tiles and prevent such aldehydes and other VOC's from being emitted into the surroundings where the ceiling tiles have been installed. The tying-up of any aldehydes and other VOC's can occur, for example, as a result of covalent chemical bonding, ionic interaction, improved incorporation of the aldehydes and/or other VOC's to the ceiling tiles at which the aldehydes and/or other VOC's are present, phase transformation, hydrogen bonding or otherwise. When a formaldehyde resin formulation is employed in the coatings, typically the emission of aldehydes will arise from that formulation. However, the aldehydes and any other VOC's that may tend to be emitted can arise from any of the components that go into the manufacture of the ceiling tile. The coatings, including the aldehyde scavenger, can be applied to the ceiling tiles either when the ceiling tiles are manufactured, at the time the ceiling tiles are installed or after the ceiling tiles are installed.

In accordance with one aspect of the invention, the aldehyde scavenger can comprise a scavenger selected from the group consisting of: tetraethylene pentamine, propionamide, caprolactam, ammonium hydroxide, sodium bisulfate, sodium metabisulfite, ammonium primary phosphate, ammonium secondary phosphate, a combination of ammonium primary phosphate and ammonium secondary phosphate, a combination of ammonium primary phosphate, ammonium secondary phosphate and a sulfite, a polyvinyl alcohol, adipic dihydrazide and a combination of a polyvinyl alcohol and adipic dihydrazide. In particular embodiments of the present invention, the aldehyde scavenger can comprise a polyvinyl alcohol such as Celvol® 205S or Celvol® 203S having a Chemical Abstracts Service registry number ("CAS Number") of 25213-24-5, adipic dihydrazide, and a combination of a polyvinyl alcohol such as Celvol® 205S or Celvol® 203S having a Chemical Abstracts Service registry number ("CAS Number") of 25213-24-5 and adipic dihydrazide.

While the present invention has been described above and illustrated with reference to certain embodiments thereof, it is to be understood that the invention is not so limited. In addition, modifications and alterations of the aspects of the invention described herein will occur to those skilled in the art upon reading and understanding the specification, including the drawings. The present invention is intended to cover and include any and all such modifications and variations to the described embodiments that are encompassed by the following claims.

What is claimed is:

1. An interior building product and a coating applied to the interior building product, the coating comprising:
   a resin formulation that includes a melamine formaldehyde resin; and
   an aldehyde scavenger selected from the group consisting of: tetraethylene pentamine, propionamide, caprolactam, ammonium hydroxide, sodium bisulfate, sodium metabisulfite, ammonium primary phosphate, ammonium secondary phosphate, a combination of ammonium primary phosphate and ammonium secondary phosphate, a combination of ammonium primary phosphate, ammonium secondary phosphate and a sulfite, a polyvinyl alcohol; adipic dihydrazide and a combination of a polyvinyl alcohol and adipic dihydrazide.

2. The interior building product and coating of claim 1 wherein the interior building product is selected from the group consisting of ceiling tile, fiber panels and wallboard.

3. The interior building product and coating of claim 1 wherein the aldehyde scavenger consists essentially of a polyvinyl alcohol.

4. The interior building product and coating of claim 1 wherein the interior building product comprises ceiling tile.

5. The interior building product and coating of claim 1 wherein the aldehyde scavenger comprises adipic dihydrazide.

6. The interior building product and coating of claim 5 wherein the interior building product comprises ceiling tile.

7. The interior building product and coating of claim 1 wherein the melamine formaldehyde resin formulation comprises by weight:
   approximately 10% to 20% of a melamine formaldehyde resin;
   approximately 20% to 60% of a calcium carbonate filler and
   approximately 0% to 10% of a clay filler;
   approximately 20% to 80% water;
   a catalyst selected from the group consisting of: ammonium chloride, magnesium chloride and a combination of ammonium chloride and magnesium chloride; and
   sufficient defoamer to suppress the formation of any foam in the resin formulation.

8. The interior building product and coating of claim 7 wherein the melamine formaldehyde resin formulation comprises by weight:
   approximately 10% to 20% of a melamine formaldehyde resin;
   approximately 35% of a calcium carbonate filler and approximately 5% of a clay filler; and
   approximately 40% water.

9. The interior building product and coating of claim 8 wherein the aldehyde scavenger consists essentially of a polyvinyl alcohol.

10. The interior building product and coating of claim 9 wherein the interior building product comprises ceiling tile.

11. The interior building product and coating of claim 8 wherein the aldehyde scavenger comprises adipic dihydrazide.

12. The interior building product and coating of claim 11 wherein the interior building product comprises ceiling tile.

13. The interior building product and coating of claim 8 wherein the aldehyde scavenger comprises a combination of a polyvinyl alcohol and adipic dihydrazide.

14. The interior building product and coating of claim 13 wherein the interior building product comprises ceiling tile.

\* \* \* \* \*